(12) United States Patent
Albizuri

(10) Patent No.: US 8,051,849 B2
(45) Date of Patent: Nov. 8, 2011

(54) GAS COOKING APPLIANCE WITH A CONCEALABLE CONTROL PANEL

(75) Inventor: Iñigo Albizuri, Muxika (ES)

(73) Assignee: Coprecitec, S.L., Aretxabaleta (Guipuzcoa) (ES)

( * ) Notice: Subject to any disclaimer, the term of this patent is extended or adjusted under 35 U.S.C. 154(b) by 997 days.

(21) Appl. No.: 11/985,540

(22) Filed: Nov. 15, 2007

(65) Prior Publication Data

US 2008/0121116 A1 May 29, 2008

(30) Foreign Application Priority Data

Nov. 24, 2006 (ES) .............................. 200602540 U

(51) Int. Cl.
*F24C 3/12* (2006.01)
*F24C 3/00* (2006.01)
*F24C 15/18* (2006.01)
*A47J 27/08* (2006.01)

(52) U.S. Cl. ..... 126/42; 126/19 R; 126/39 B; 126/39 R; 126/41 R; 126/273 R; 99/337

(58) Field of Classification Search ................ 126/19 R, 126/273 R, 41 R, 39 R, 39 B; 99/337
See application file for complete search history.

(56) References Cited

U.S. PATENT DOCUMENTS

| 2,059,735 | A | | 11/1936 | Kennedy | |
|---|---|---|---|---|---|
| 2,539,840 | A | * | 1/1951 | Jones | 126/39 B |
| 3,597,996 | A | * | 8/1971 | Gouwens et al. | 74/553 |
| 4,011,513 | A | * | 3/1977 | Kawachi | 455/157.1 |
| 4,141,226 | A | * | 2/1979 | Sasahara | 464/117 |
| 4,831,999 | A | * | 5/1989 | Berkelder | 126/19 R |
| 6,253,760 | B1 | * | 7/2001 | Mashburn et al. | 126/41 R |
| 2008/0121116 | A1 | * | 5/2008 | Albizuri | 99/337 |

FOREIGN PATENT DOCUMENTS

EP 1001225 A1 5/2000

* cited by examiner

*Primary Examiner* — Kenneth Rinehart
*Assistant Examiner* — William Corboy
(74) *Attorney, Agent, or Firm* — Tim L. Kitchen; Peter B. Scuil; Berenbaum Weinshienk PC

(57) ABSTRACT

A gas cooking appliance having a plurality of spaced-apart taps situated in fixed and non-moveable locations within the gas cooking appliance, each of the taps having a rotatable operating shaft coupled to an associated control knob situated on a pivoting control panel. The pivoting control panel is connected to a pivot shaft and is pivotal between a first angular position and a second angular position. Each of the control knobs is coupled to its associated tap by a coupling, each of the couplings including a stationary transmission, a pivoting transmission shaft having a first end and a second end and a joint that couples the pivoting transmission shaft to the stationary transmission shaft. The pivot shaft, by means of which the control panel pivots, being situated proximate the coupling joints.

12 Claims, 4 Drawing Sheets

GAS COOKING APPLIANCE WITH A CONCEALABLE CONTROL PANEL

The present invention relates to a domestic cooking appliance and to the arrangement of the combustible gas control panel, combined with the kinematic transmission from the knobs to the gas taps.

PRIOR ART

There are known gas cooking appliances such as that disclosed in EP-1001225-A, which are provided with various rotary taps for the individual regulation of a flow of combustible gas, fitted onto an interior structure of the cooking appliance. The rotary operating knobs are fixed onto a vertical control panel of the cooking appliance, projecting out to the exterior. Due to the fact that the operating knobs are distanced from the taps, cardan shafts are used to transmit the rotation from the operating knob to the corresponding tap.

The gas cooking apparatus disclosed in US-2059735 has a gas distributor unit with the regulation taps and the operating knobs of the taps, all of them fitted on a front panel that is completely retractable towards the interior of the structure of the cooking appliance. The taps are distanced from the operating knobs but are not rotary, and as a result they do not need an articulated shaft in order to transmit the movement from the operating knob. Nor is the distributor unit with the taps fixed to an internal structure of the apparatus, but rather to the exterior mobile panel itself, as a result of which the latter performs a linear movement so that it can be concealed in the interior of the structure, pulling the controls with the transmission shaft and also the distributor unit with the taps by means of a kinematic mechanism comprising connecting rods and a spring.

DISCLOSURE OF THE INVENTION

It is an object of the invention to provide a gas cooking appliance that has a concealed control panel in a rest position beneath a cover of the appliance, being extendable towards the exterior to an operating position and with the operating knobs thereby being exposed to the user, wherein each gas regulation tap is connected for its rotation to the corresponding operating knob by means of an articulated transmission shaft.

The gas cooking appliance of the invention comprises a gas distributor unit with regulation taps that is supported on a front wall of the appliance, and an additional cover above the front plate beneath which the control panel with the operating knobs is concealed by means of its retraction to a rest position. In the operating position the control panel is situated with the operating knobs exposed on the front side of the appliance. Due to the separation space between the operating knobs and the rotary gas taps, the latter are operated by means of a cardan shaft connected to the corresponding operating knob. The control panel is retracted and extends from one angular position to another by means of its pivoting around a horizontal pivoting shaft that is supported by an intermediate joint of each of the shafts transmitting the rotary movement. It is not necessary, therefore, to build an additional support for the pivoting of the control panel from one angular position to another, and at the same time a cavity for concealing the controls is constructed by means of a simple additional protective cover over the front panel of the appliance.

It is another object of the invention to provide a gas cooking appliance with a control panel that is disposed with a support foot for its pivoting around a horizontal shaft, and, with the control panel in either of the rest or operating positions, the different parts of the control panel close off from the exterior a cavity of concealment between said cover and the control panel.

DETAILED DISCLOSURE OF THE INVENTION

Figure 1:
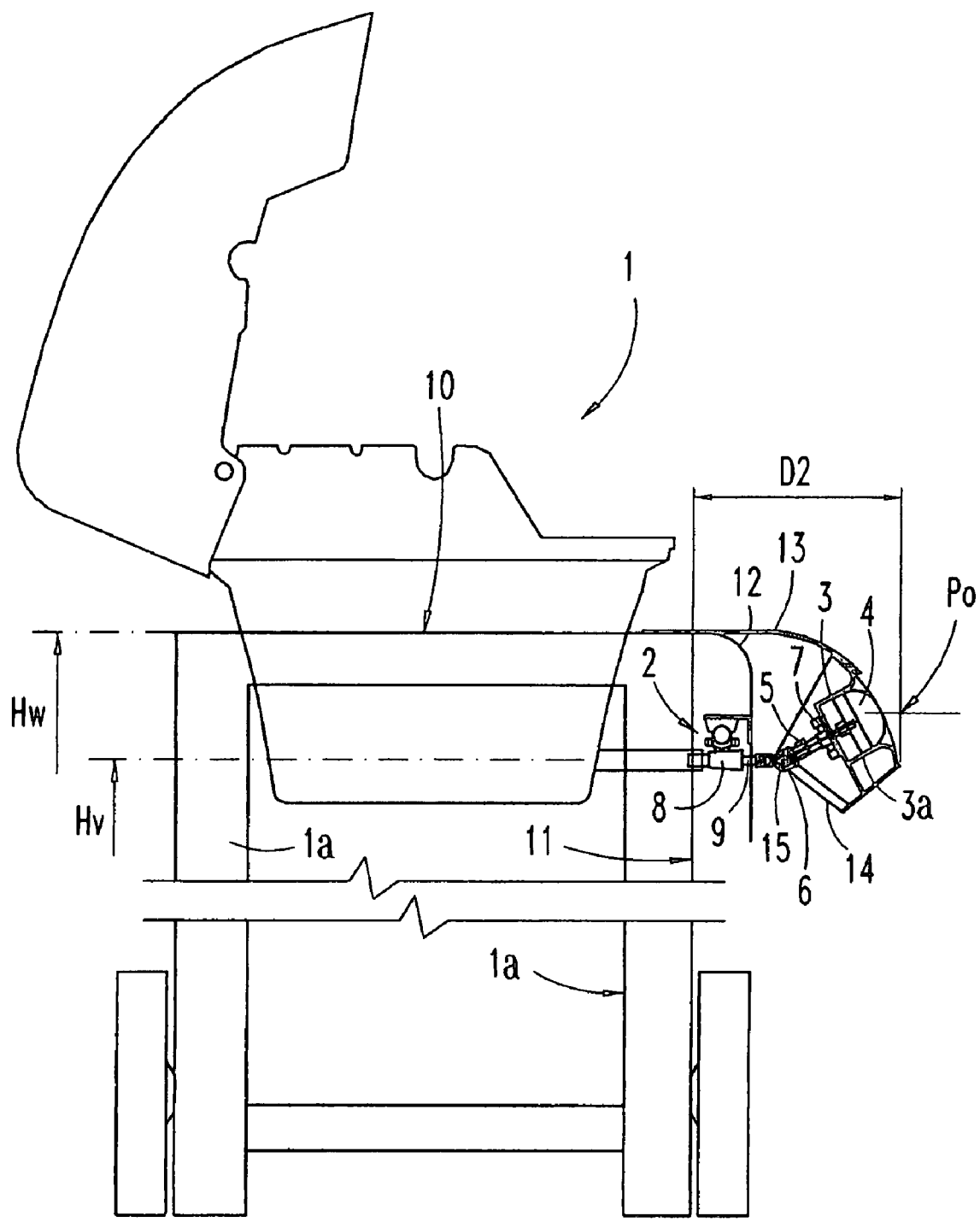
FIG. 1 is a view in profile of a gas cooking appliance showing a control panel with the operating knobs in an operating position.

With reference to FIGS. 1-4, a preferred embodiment of the cooking appliance 1 comprises an appliance structure 1a formed by vertical walls supporting a cooking surface or flat area with a working height "Hw", an external vertical wall 11 upon which the components of the cooking appliance are fitted, a front plate 12 upon which is supported the gas distributor unit 2, which is provided with a series of rotary taps 8 in a fixed position in relation to said vertical fitting wall 11, a pivotable control panel 3 provided with a series of operating knobs 4 corresponding to each tap 8, and a horizontal pivoting shaft 6 for the control panel 3.

The gas distribution unit 2 comprises a gas distribution conduit 2a for the supply of an individual flow "Q" to the cooking surface 10 from each of the taps 8, which are spaced apart from each other on the front plate 12. Each of the gas taps 8 is provided with a horizontally disposed rotating operating shaft 9. The front plate 12 forms a cavity 12a with the external vertical wall 11 of the structure, in which the distributor unit 2 is housed, the operating shafts 9 of the taps projecting out of the front plate 12, aligned in parallel and horizontal to a height "Hv" below the height "Hw" of the cooking surface 10.

Figure 2:
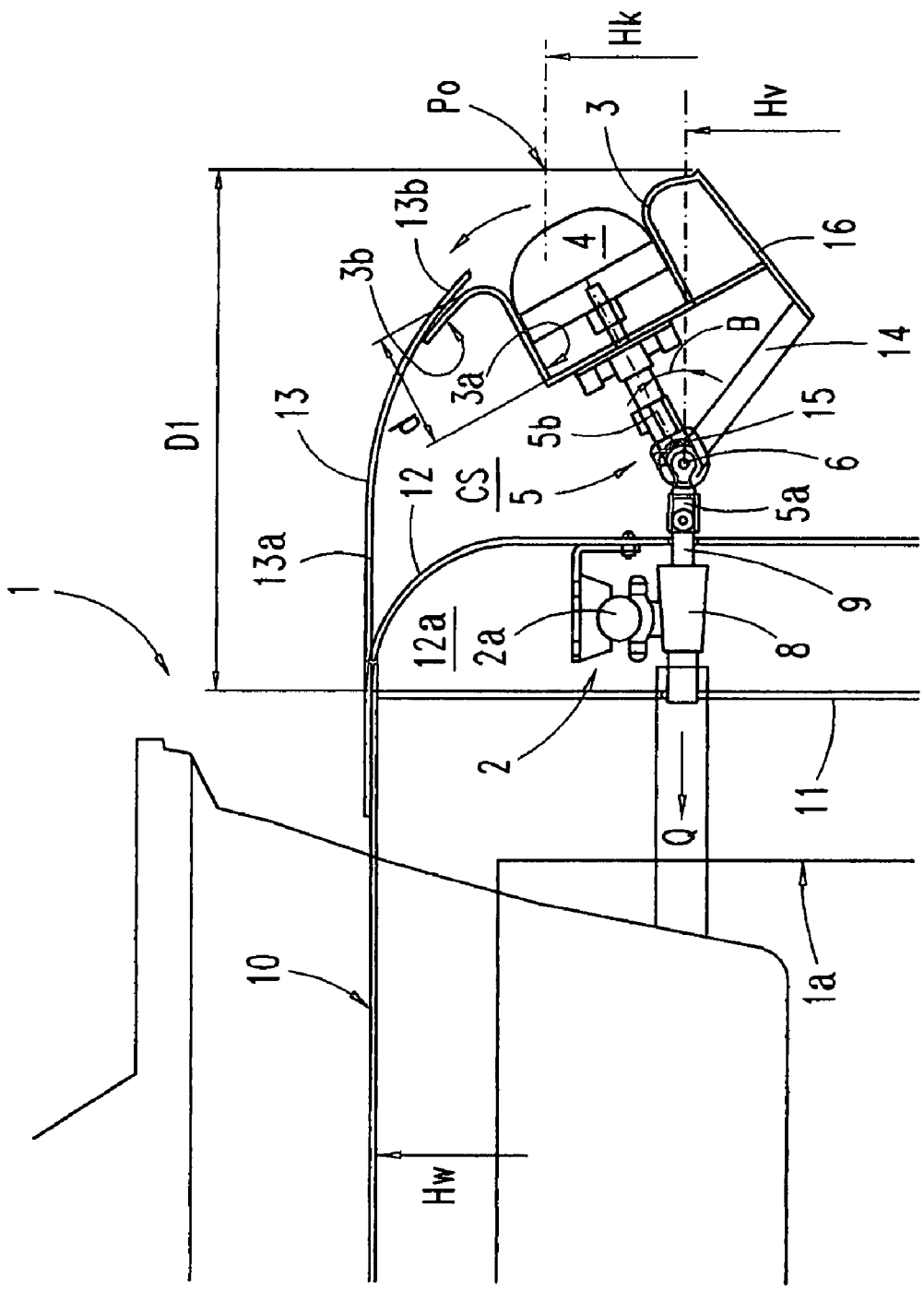
FIG. 2 is a partial view of the gas cooking appliance of FIG. 1 with the control panel extended in an operating position.

The substantially cylindrical operating knobs 4 are fitted on the control panel 3, each one housed in an individual cylindrical cavity 3a formed in the control panel at a depth "d" (FIG. 2). The control panel 3 is supported by means of a support foot 14 connected to the horizontal pivoting shaft 6 so that it may be turned at an angle "A" between both the operating position "Po" and the rest position "Pr" of the control panel 3. A cover 13 is incorporated into the appliance 1 over the control panel 3, the aim being to form a cavity CS concealing the control panel 3 as well as protecting the operating knobs 4 and the transmission shafts 5. The cover 13 is formed by a part with a straight horizontal profile 13a, at a height corresponding to the height "Hw" of the cooking surface 10 and with a final curved part 13b, which projects out of said front part 12 over the transmission shafts 5 and the control panel 3.

The shaft 7 of each operating knob 4 passes through its cylindrical cavity 3a in the control panel 3, and is connected for rotation to the operating shaft 9 of the corresponding tap by means of a cardan transmission shaft 5. The control panel 3 is supported by means of a support foot 14 connected to the horizontal pivoting shaft 6, so that it pulls the operating knobs 4 in their pivoting of angle "A". Each cardan shaft 5 has an intermediate support joint 15 connected to the operating shaft 9 of the corresponding tap 8, by means of which the pivoting shaft 6 is kept horizontal. The intermediate joint 15 divides the cardan shaft 5 in a first fixed segment 5a connected to the operating shaft 9 of the corresponding tap 8, and in a second pivoting segment 5b connected to the corresponding operating knob 4. In this way, the second segments 15b, pulled by the control panel 3, also rotate around the pivoting shaft 6. The pivoting shaft 6, which passes through the intermediate joints 15 of all the transmission shafts 5, is supported on the segments of the cardan shaft 5a that are connected to each tap 8.

With reference to FIG. 2, in its operating position "Po" the control panel 3 positions the operating knobs 4 outside the cover 13, at a certain height "Hk" of the structure in accordance with the user, and oriented towards him/her at a gentle angle of inclination "B", for example 200 in relation to the horizontal plane. This same angle "B" is the inclination upwards of the rotating segment 5b of the cardan shafts connected to the operating knobs 4. The front part 3a of the control panel 3 is inclined at an angle complementary to the angle "B".

The cover 13 projects out of the front side 11, 12 of the appliance over the control panel 3, and forms a cavity CS concealing the control panel 3, closed to the exterior for the protection of the controls 4 and the transmission shafts 5. The inclined part of the control panel 3 has a free wing 3b that is curved inwards so that when the control panel 3 pivots towards its rest position "Pr", the free wing 3b has an inlet beneath the cover 13, the shape of which matches the final curved part 13b of the cover 13. Said cavity of concealment CS is thus closed from above beneath the cover 13 with the control panel 3 in its interior. The control panel 3 also has a square part of wall 14, 16 that extends downwards from the level of the operating knobs 4 including the support foot 14, closing the protective cavity CS beneath the transmission shafts 5 from the exterior. The horizontal space "D1" that the control panel 3 projects out of the structure 1a from is, for example, D1=165 mm, measured from the vertical wall 11 of the structure 1a.

Figure 3:
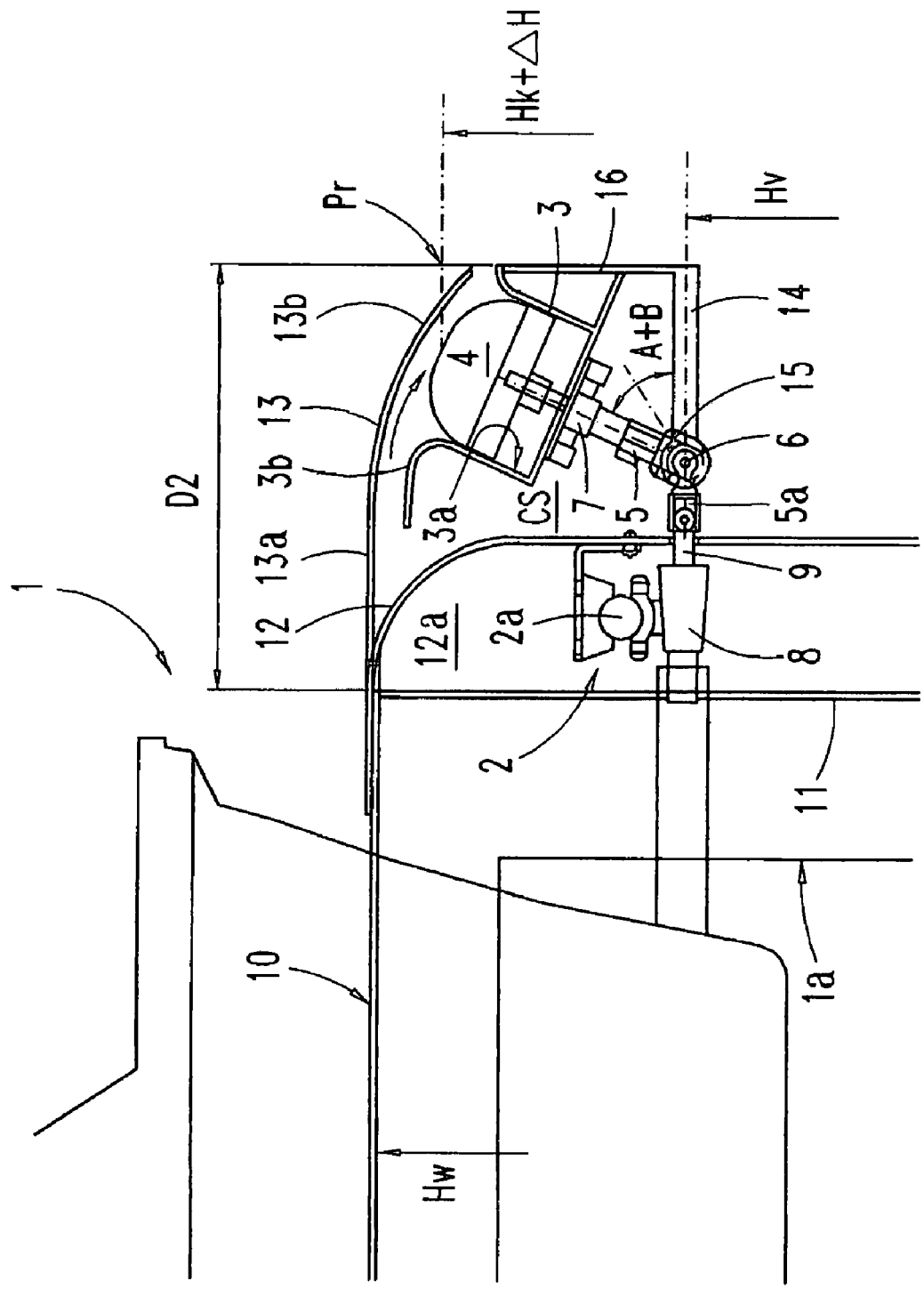
FIG. 3 is a partial view of the gas cooking appliance of FIG. 1 with the control panel concealed in a rest position.
Figure 4:
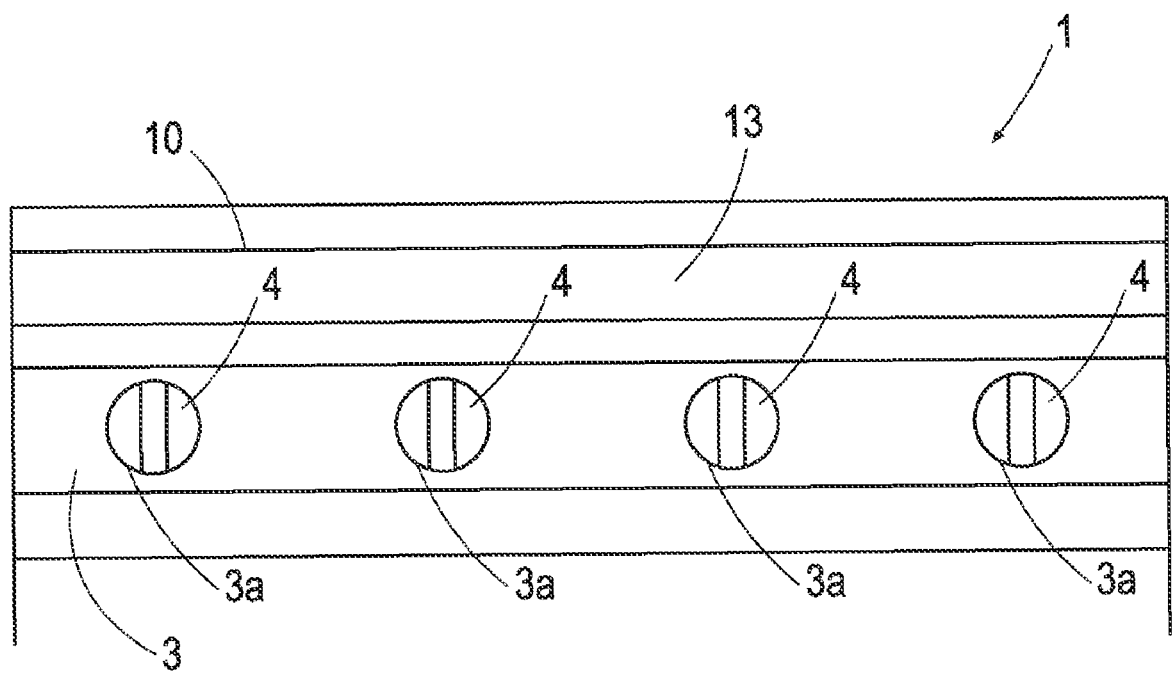
FIG. 4 is a partial front view of the gas cooking device showing the operating knobs of the taps situated on the pivoting control panel.

With reference to FIG. 3, from said operating position "Po" of the operating knobs 4, the control panel 3 effects a pivoting of an angle "A" for its retraction to a rest position "Pr", in which the operating knobs 4 are concealed beneath the cover 13, while said free wing 3b of the control panel closes the final part 3b of the cover 13. In this rest position "Pr" the inclination of the shafts 7 of the operating knobs 4 is of an angle "A+B", for example, of 60°, the operating knobs 4 remain beneath the cover 13 at a greater height "Hk+ΔH" than in the rest position "Pr" of FIG. 2, and in addition the horizontal space "D2" that projects out of the control panel 3 from said vertical wall 11 is reduced, for example, to D2=135 mm. Now the support foot 14 of the control panel 3 is disposed approximately horizontally, constituting a base 14 for the cavity of concealment CS at a height corresponding to the height "Hv" of the taps 8, while the part of panel 16 forming a square profile with the support foot 14 closes the cavity CS from the exterior, positioning itself vertically next to the free end 13b of the cover.

The invention claimed is:

1. A gas cooking appliance comprising a plurality of spaced-apart taps situated in fixed and non-moveable locations within the gas cooking appliance, each of the taps having a rotatable operating shaft coupled to an associated control knob situated on a pivoting control panel, the pivoting control panel connected to a pivot shaft and pivotal between a first angular position and a second angular position, each of the control knobs coupled to its associated tap by a coupling, each of the couplings comprising a stationary transmission shaft having a first end and a second end, a pivoting transmission shaft having a first end and a second end, and a single universal joint that couples the second end of the pivoting transmission shaft to the first end of the stationary transmission shaft, the first end of the pivoting transmission shaft coupled with the control knob, the second end of the stationary transmission shaft coupled to the rotatable operating shaft of the tap, each of the universal joints situated proximate the pivot shaft.

2. A gas cooking appliance according to claim 1, wherein the gas cooking appliance comprises a horizontal heating surface, the stationary transmission shafts oriented parallel to the horizontal heating surface.

3. A gas cooking appliance according to claim 1, wherein the gas cooking appliance comprises a horizontal heating surface, the stationary transmission shafts situated below and oriented parallel to the horizontal heating surface.

4. A gas cooking appliance according to claim 2, wherein the each of the rotatable operating shafts of the taps and the pivot shaft are positioned at a first height relative to the horizontal heating surface.

5. A gas cooking appliance according to claim 3, wherein the each of the rotatable operating shafts of the taps and the pivot shaft are positioned at a first height relative to the horizontal heating surface.

6. A gas cooking appliance according to claim 1, wherein the control panel comprises a plate to which the control knobs are mounted and a support foot having a first end and a second end, the first end of the support foot being coupled to the plate, the second end of the support foot being coupled with the pivot shaft.

7. A gas cooking appliance according to claim 6, wherein the plate is coupled to the first end of the support foot by an intermediate member that fixes the plate and support foot at a fixed angular orientation with respect to one another.

8. A gas cooking appliance according to claim 2, wherein the control panel comprises a plate to which the control knobs are mounted and a support foot having a first end and a second end, the first end of the support foot being coupled to the plate, the second end of the support foot being coupled with the pivot shaft.

9. A gas cooking appliance according to claim 8, wherein the plate is coupled to the first end of the support foot by an intermediate member that fixes the plate and support foot at a fixed angular orientation with respect to one another.

10. A gas cooking appliance according to claim 9, wherein when the control panel is in the first angular position the support foot in oriented parallel to the horizontal heating surface and the intermediate member is oriented orthogonal to the horizontal heating surface.

11. A gas cooking appliance according to claim 9, wherein when the control panel is in the first angular position the support foot in oriented parallel to the horizontal heating surface and the intermediate member is oriented orthogonal to the horizontal heating surface and forms an external surface of the gas cooking appliance.

12. A gas cooking appliance according to claim 1, wherein when the control panel is in the first angular position it forms with another part of the gas cooking appliance a cavity within which the control knobs reside in hidden view to the exterior of the cooking appliance.

* * * * *